March 5, 1968 D. T. THOMPSON 3,371,624
APPARATUS FOR MAKING A TOROID
Filed Feb. 10, 1966 8 Sheets-Sheet 1
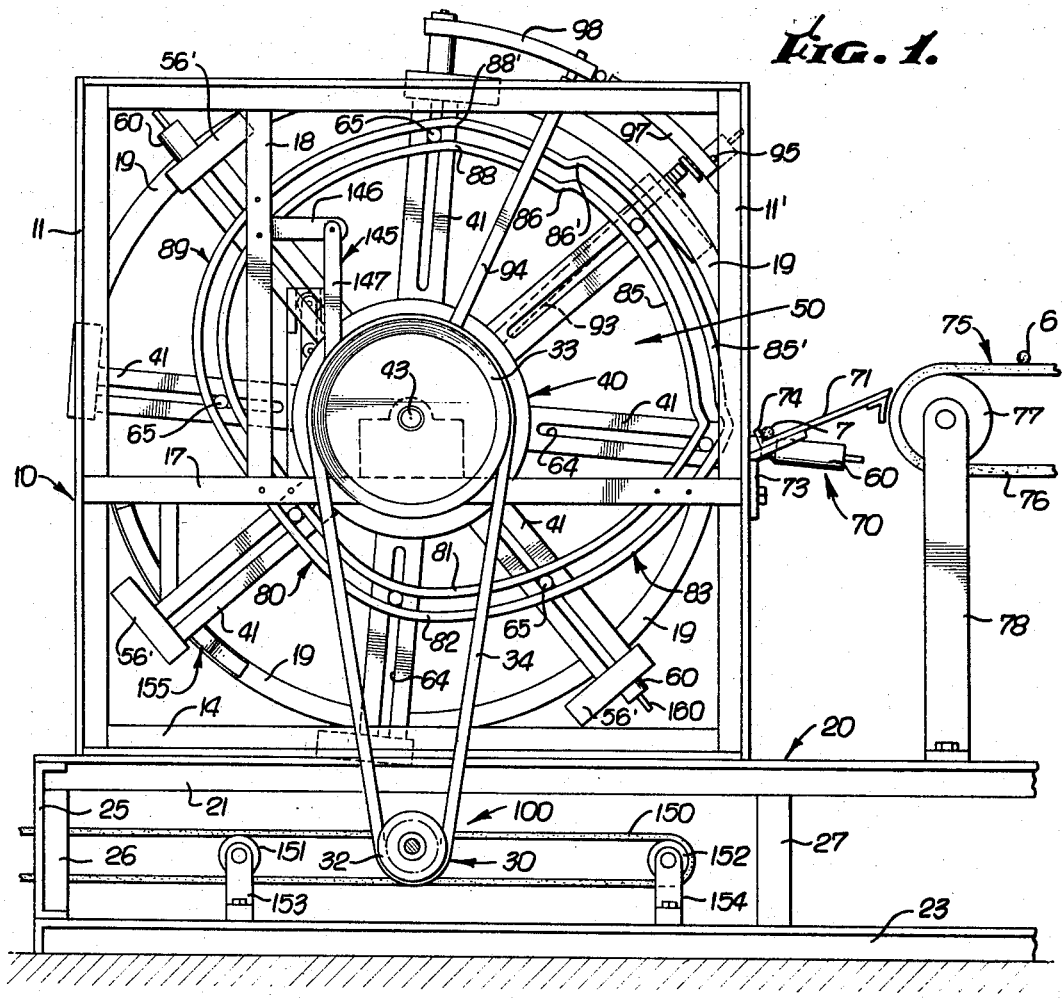
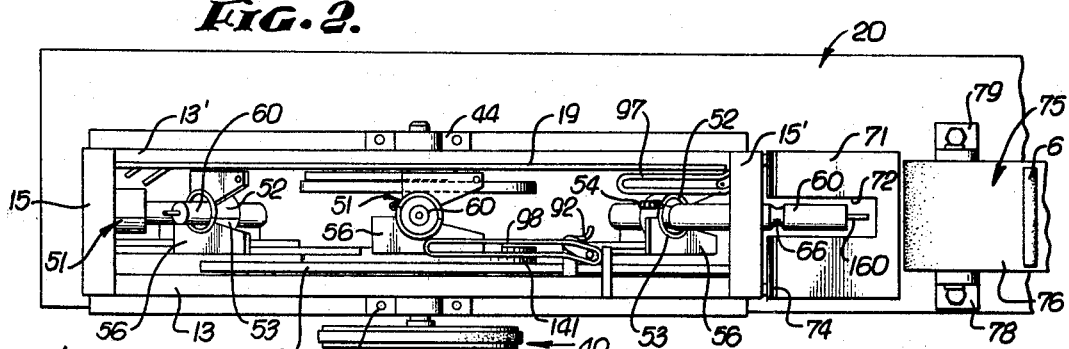
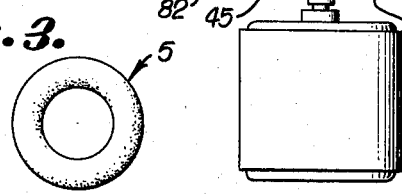
INVENTOR.
DANIEL T. THOMPSON
By Mikitta, Glenny, Poms & Smith
ATTORNEYS.

March 5, 1968 D. T. THOMPSON 3,371,624
APPARATUS FOR MAKING A TOROID
Filed Feb. 10, 1966 8 Sheets-Sheet 2

INVENTOR
DANIEL T. THOMPSON
By
Miketta, Glenny, Poms & Smith
ATTORNEYS.

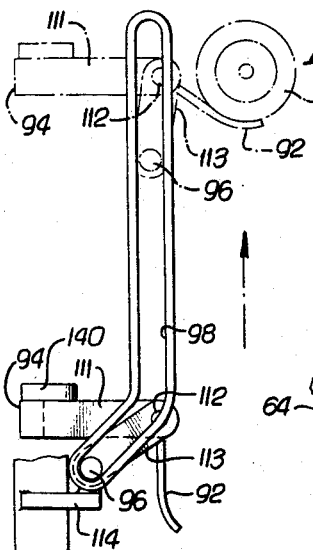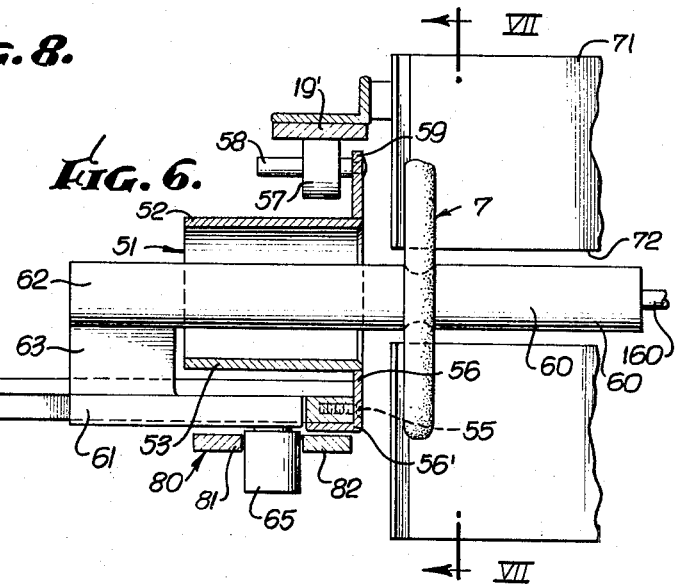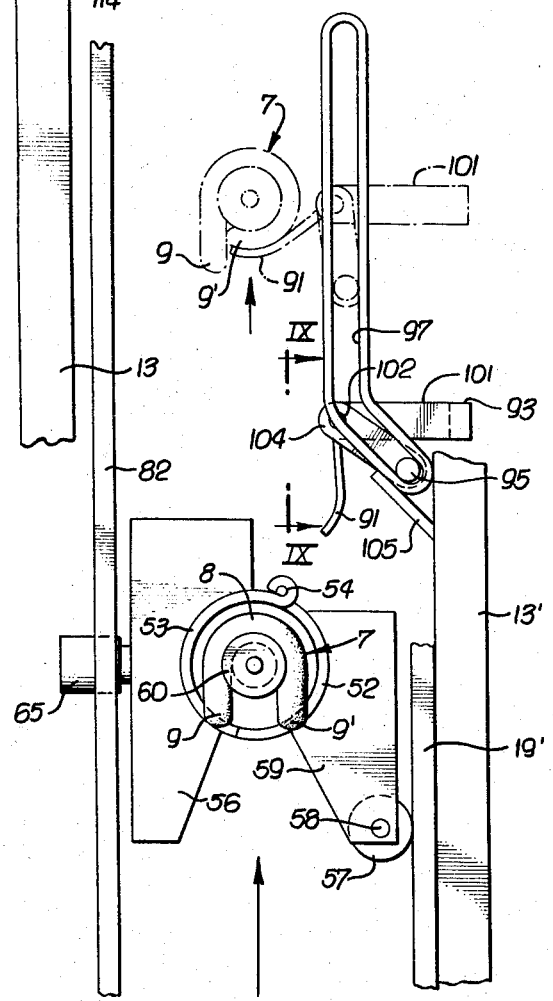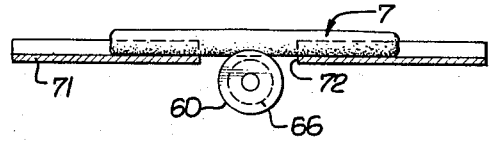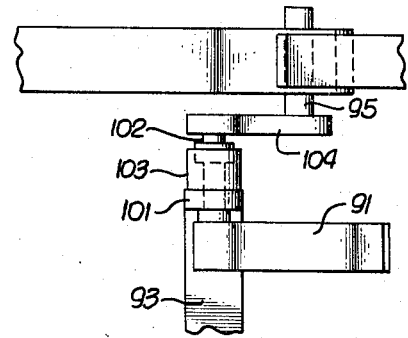

March 5, 1968 D. T. THOMPSON 3,371,624
APPARATUS FOR MAKING A TOROID
Filed Feb. 10, 1966 8 Sheets-Sheet 4
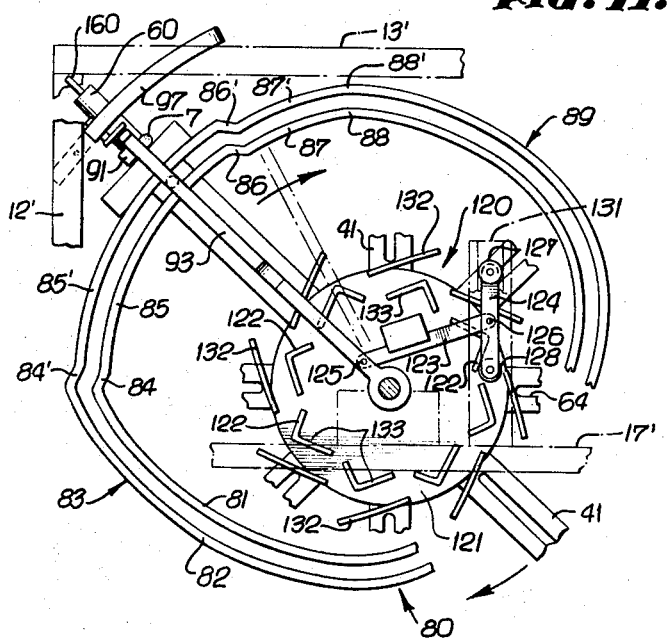
FIG. 10.
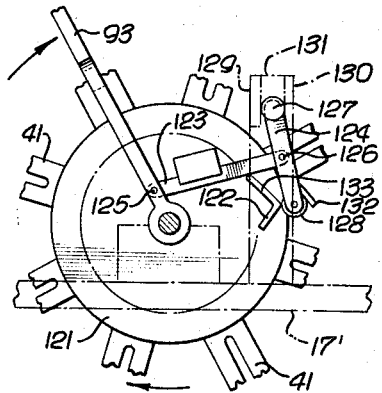
FIG. 11.
FIG. 12.
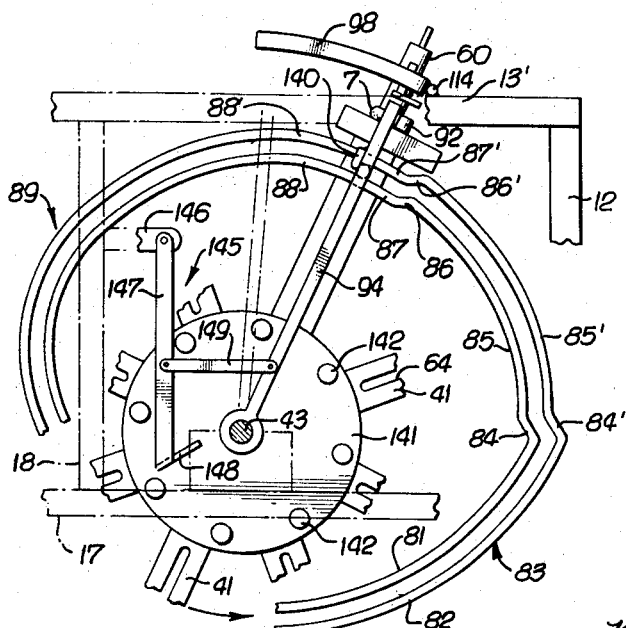
FIG. 13.
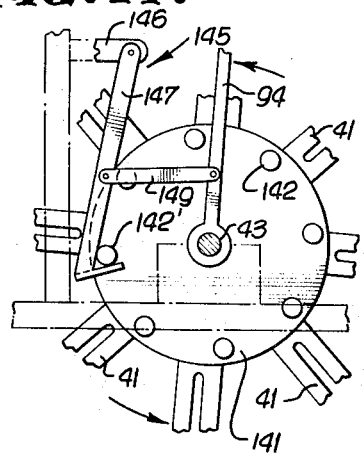
FIG. 14.
INVENTOR.
DANIEL T. THOMPSON
By
Miketta, Glenny, Poms & Smith
ATTORNEYS.

March 5, 1968 D. T. THOMPSON 3,371,624
APPARATUS FOR MAKING A TOROID
Filed Feb. 10, 1966 8 Sheets-Sheet 5

INVENTOR.
DANIEL T. THOMPSON
BY Miketta, Glenny, Poms & Smith
ATTORNEYS.

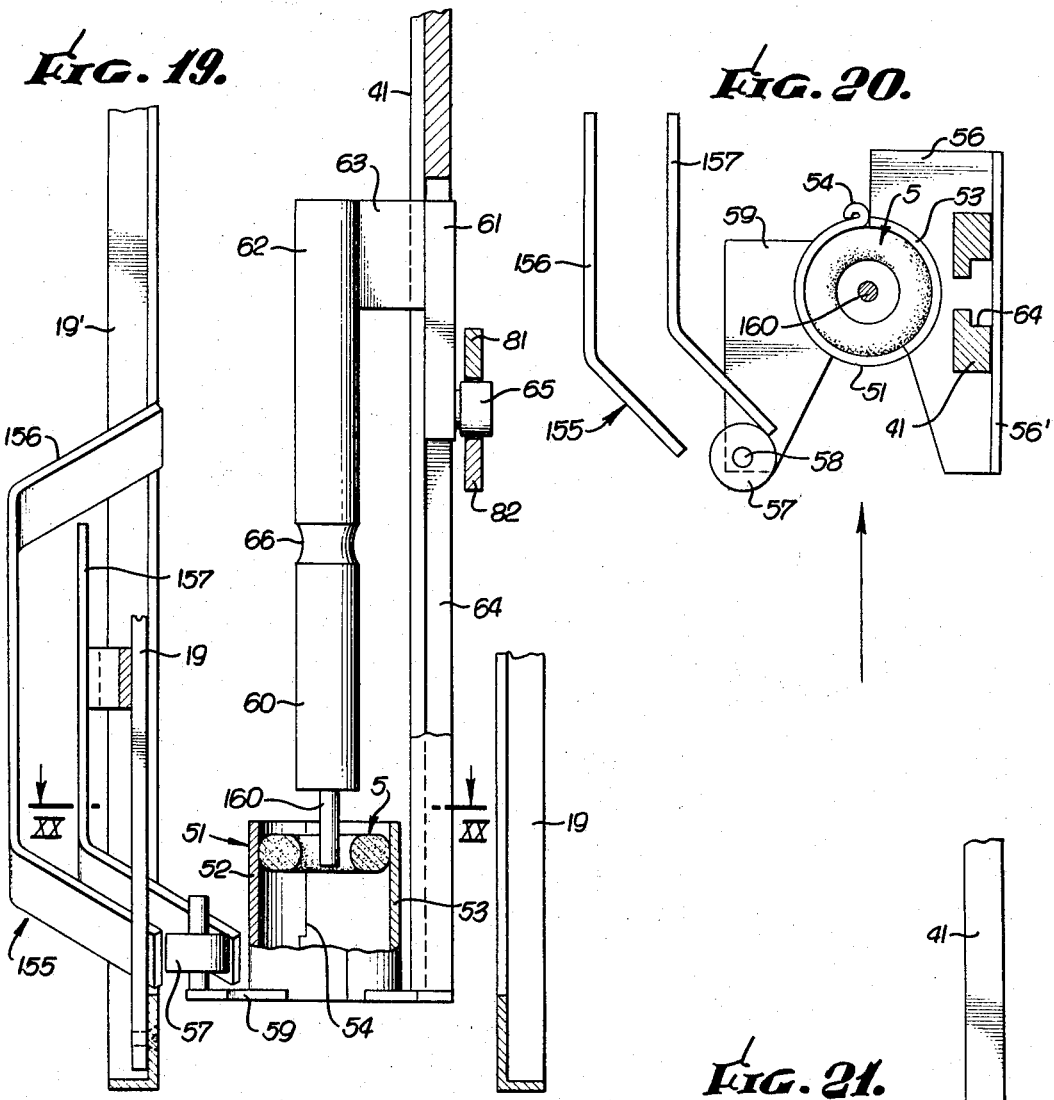
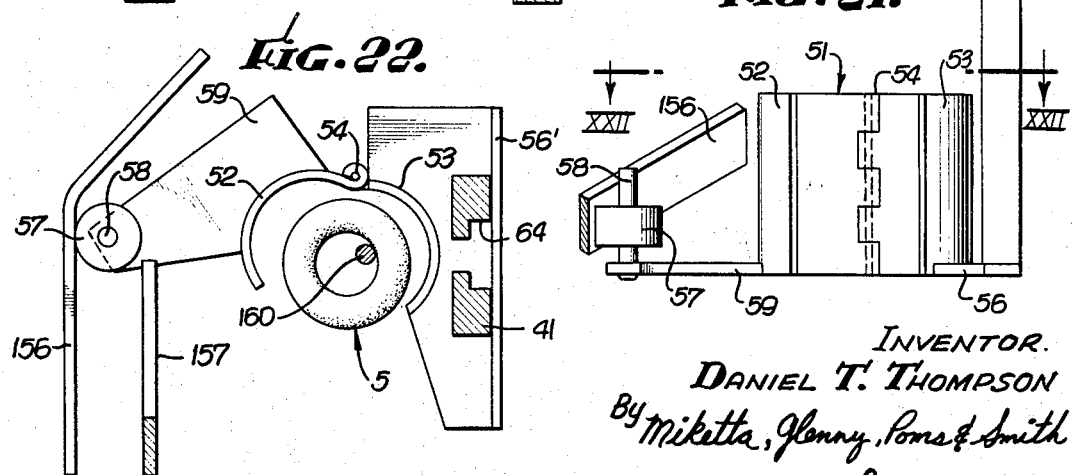

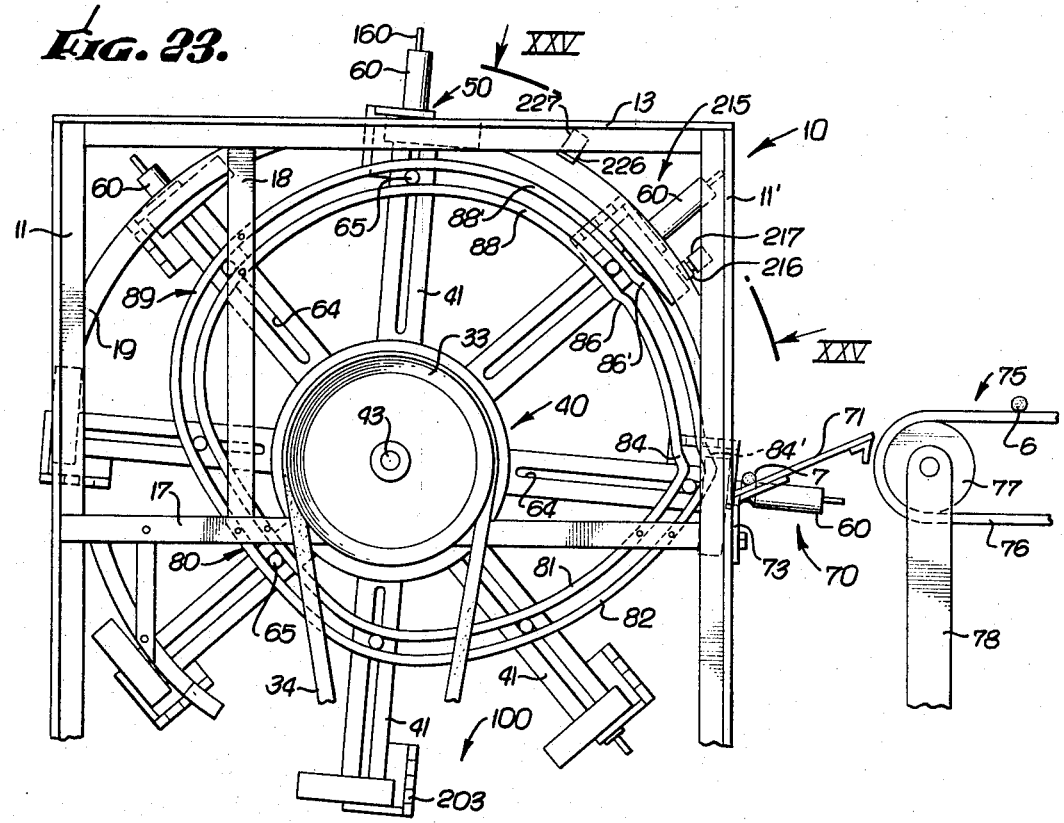
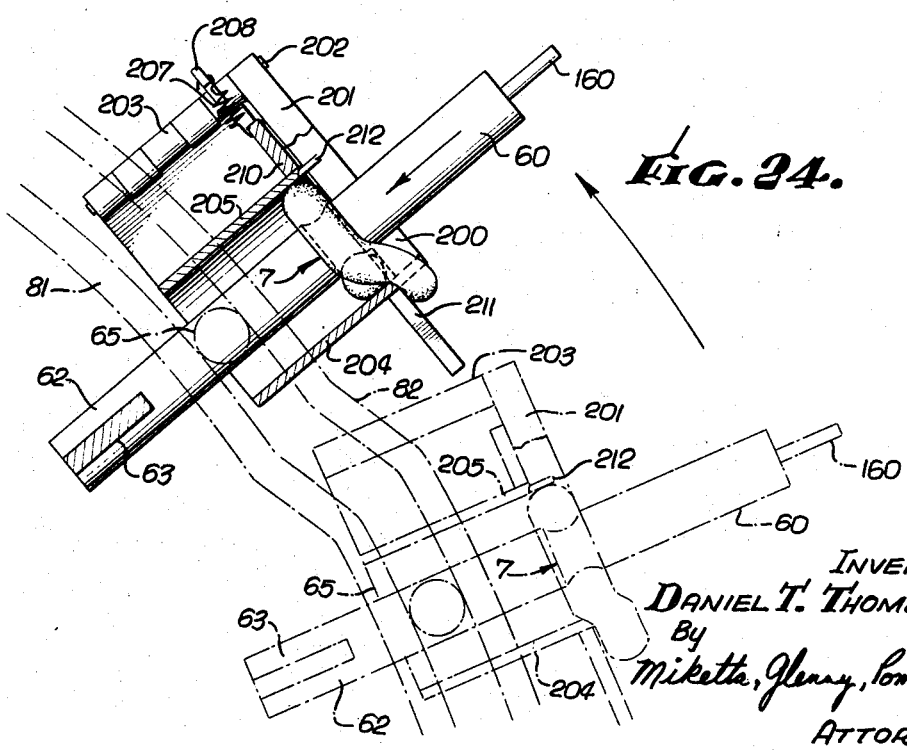

March 5, 1968 D. T. THOMPSON 3,371,624
APPARATUS FOR MAKING A TOROID
Filed Feb. 10, 1966 8 Sheets-Sheet 8
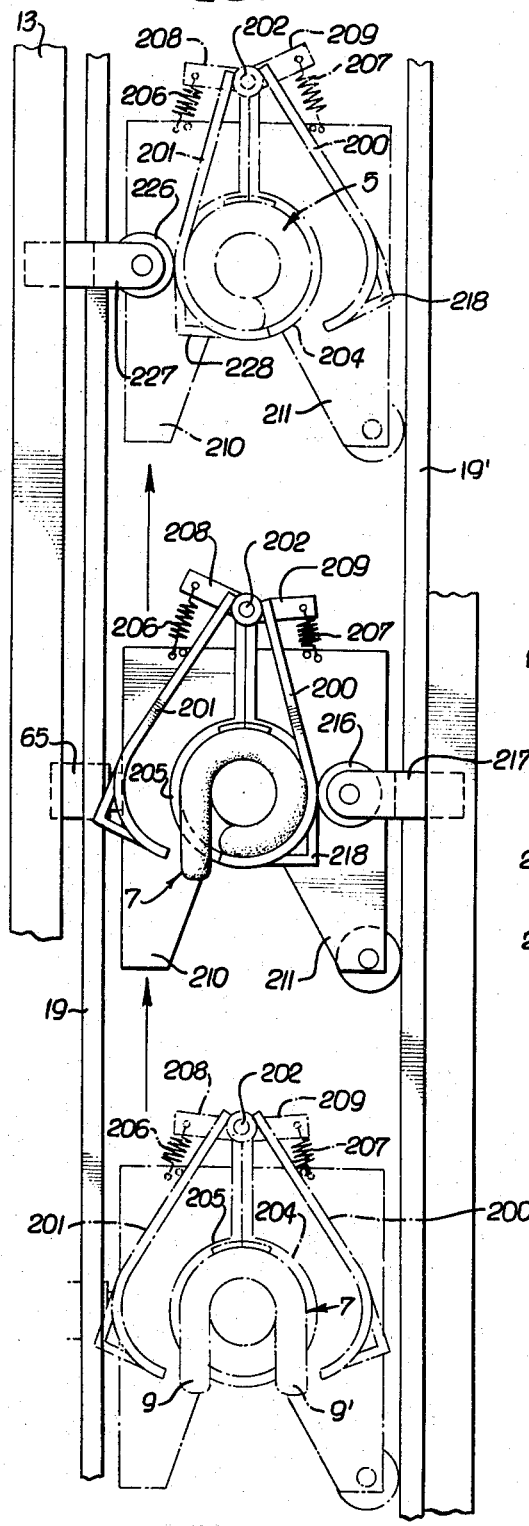
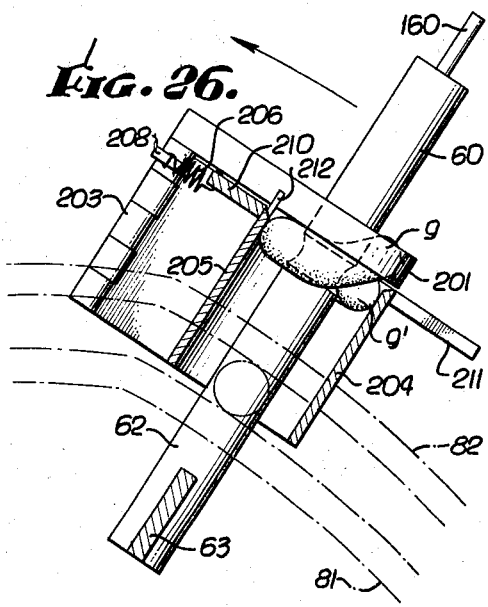
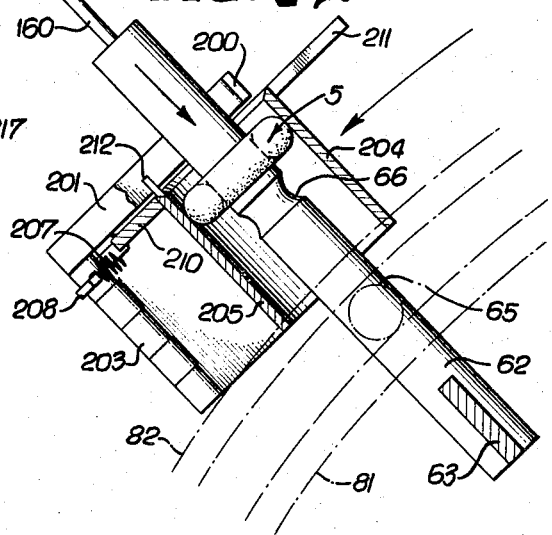
INVENTOR.
DANIEL T. THOMPSON
By Miketta, Glenny, Poms & Smith
ATTORNEYS.

United States Patent Office 3,371,624
Patented Mar. 5, 1968

3,371,624
APPARATUS FOR MAKING A TOROID
Daniel T. Thompson, 10584 Bradbury Road,
Los Angeles, Calif. 90064
Filed Feb. 10, 1966, Ser. No. 526,474
15 Claims. (Cl. 107—8)

ABSTRACT OF THE DISCLOSURE

An apparatus for converting strips of pliant material, such as dough, into toroids by forming the strips between axially movable sleeve and mandrel assemblies mounted for concurrent rotation about a common axis wherein means are provided for feeding and positioning stationary strips of pliant material perpendicularly to and transversely across the path of travel of the rotating mandrels to cause successive strips to be picked up and carried along on successive mandrels, each strip picked up and carried by a mandrel being preformed into a generally U-shape about its associated mandrel due to the relative movement between the rotating mandrel and the positioned strip. Curling means are provided for curling the free ends of each preformed generally U-shaped strip of pliant material about the associated mandrel into overlapping curled contact, the strip ends overlapping rather than abutting, with each other prior to the strip being formed into a homogeneous toroid between the relatively movable associated mandrel and sleeve portions of the assemblies. The sleeve and mandrel assemblies are mounted for concurrent rotation about a generally horizontal axis in a generally vertical plane with a feeding station located adjacent one edge of the plane defined by the extremeties of the assemblies and at approximately the level of the axis of rotation thereof. A strip of material picked up at the feeding station in the zone generally level with the axis of rotation of the sleeve and mandrel assemblies is then carried by the mandrel successively into a curling zone, a forming zone and a discharge zone.

In the forming of the pliant strip of material into a toroid, means are provided for partially retracting each mandrel relative to its associated sleeve on picking up of a strip of material to pinch the bight portion of the preformed generally U-shaped strip between the mandrel and sleeve while the strip free ends are curled about the mandrel in overlapping relation in the curling zone. The curling assemblies may be mounted on each of the rotating sleeve or mandrel assemblies or may be mounted to the apparatus frame for operating upon mandrel assemblies as they pass thereby. In curling the ends of the pliant material into overlapping relation about the mandrel prior to its being formed into a toroid, a first withdrawal of the mandrel into the sleeve pinches the bight portion of the strip between the mandrel and sleeve to hold it in fixed position on the mandrel; after a first end is curled about the mandrel, a further withdrawal of the mandrel into the sleeve lowers the first curled end and allows curling of the second free end into an overlapping relation to allow forming of the thus overlapped free strip ends into a toroid configuration.

Background of the invention

This invention relates in general to an apparatus for quickly converting strips of pliant, deformable, plastic composition or materials, such as dough, into coherent toroids. More particularly, this invention relates to such an apparatus particularly well suited for quickly forming strips of relatively tough, elastic dough, required in making bagels, into an annulus or toroid configuration preparatory to baking the dough into a finished bagel.

In the art of forming and baking bagels in the past, it has been the general practice to hand roll a strip of the relatively heavy, tough and elastic dough into a generally cylindrical strip. The baker then turned the free ends of the strip around his fingers, overlapping the ends, and manually formed the strip into an annulus. These overlapped ends were then hand rolled into integral relation to form a toroid. However, the toroid so formed generally had a non-uniform thickness and was not rapidly or economically produced.

Apparatus for mechanically forming dough into toroids or an annulus configuration, suitable for making bagels, are disclosed in prior Patents Nos. 2,584,514 and 3,031,979. In Patent 2,584,514 a plurality of forming assemblies are mounted for rotation in a horizontal plane about a common vertical axis. Certain problems in material handling have occurred in connection with the operation of this machine. For example, the dough strips have been fed to the forming assemblies perpendicular to the direction of forming assembly travel. This has required precise setting and frequent adjusting of the relative operation of the dough strip feeding apparatus and the rotation of the forming assemblies in order to properly place a mid-portion of each dough strip adjacent and in contact with a rotating forming assembly mandrel. This straight dough strip was then curled or bent about the mandrel and formed by drawing the mandrel downwardly through the rotating sleeve. No particular means was provided for holding the dough strip against the mandrel in a non-slip relationship prior to the curling operation. The release of the formed toroid was in a direction toward the mandrel which required a relative shifting between the mandrel and its associated sleeve so as to permit the toroids to drop past the mandrel. No particular means were provided for releasing a toroid if it tended to adhere to the sleeve sections. Further, the apparatus is somewhat complex in its manufacture and operation.

In Patent 3,031,979, a ball-like batch of plastic, deformable, pliant composition is fed into the forming assemblies and formed into a toroid. This apparatus does not operate on a cylindrical strip of dough as in the prior Patent 2,584,514. In forming a ball-shaped batch of dough into a toroid, a considerable working of the dough occurs and it is necessary to adjust the recipe or ingredients of the dough as well as the proofing time, during which the dough is allowed to rise, prior to baking to compensate therefor.

It is, therefore, the principal object of the present invention to disclose and provide a machine adapted to accept strips of dough having the ingredients or recipe conventionally used in bakeries where the dough is manually rolled and formed which can quickly convert such strips of dough into toroids similar to hand-rolled bagels with a minimum of working of the dough, to prevent toughening or hardening of the dough so that conventional proofing time prior to baking can be maintained, and which is less complex, easier to operate and requires a minimum of service or re-adjustment in its operation than the prior machines.

It is another object of the present invention to disclose and provide an apparatus for quickly converting strips of pliant material, such as dough used in making bagels, wherein a plurality of forming assemblies are radially mounted for concurrent rotation about a common axis and means are provided for feeding strips of dough transversely of and in the path of travel of said assemblies to be picked up and carried along on the assemblies so that each strip is thereby preformed preparatory to being curled about the mandrel due to the movement of each mandrel past a feeding station supplied with such dough strips.

It is an object of the present invention to disclose and provide the apparatus of the foregoing object wherein means are provided for pinching or holding a mid-portion of a picked-up dough strip between portions of the forming assembly to securely hold it in position upon the mandrel during the curling of the strip free ends about the mandrel.

It is another object of the present invention to disclose and provide an apparatus as in the foregoing objects wherein curling means are provided at the forming zone for curling the ends of each strip picked up and carried along on the assemblies about the associated mandrel into overlapping contact with each other and the curling means so provided are actuated due to the passage of the forming assemblies through the forming zone.

It is another object of the present invention to disclose and provide an apparatus as in the foregoing object wherein means are provided for partially retracting each mandrel into its associated sleeve to pinch or hold a mid-portion of the picked-up strip between the mandrel and opposing portions of the sleeve while the free ends are curled about the mandrel and prior to the strip being formed into a toroid.

It is a still further object of the present invention to disclose and provide an apparatus for quickly converting strips of pliant material such as dough into seamless toroids wherein a plurality of forming assemblies are radially mounted for concurrent rotation about a generally horizontal axis wherein each forming assembly is rotated upwardly past a feeding station where it picks up and carries along a dough strip positioned at the feeding station, continues on through a forming zone where each strip is formed into a toroid in a zone generally above the level of the apparatus main axis and each toroid is released in a direction away from the inverted forming assemblies in a discharge zone below the level of the apparatus main axis.

It is another object of the present invention to disclose and provide means for projecting the mandrel of each forming assembly of the foregoing object so that the mandrel is projected from its associated forming sleeve as it passes through the feeding station to receive and preform a dough strip into a generally U-shape on the mandrel. It is a further object to disclose and provide together with such means for projecting the mandrel, means for partially retracting the mandrel relative to its associated sleeve after a dough strip has been picked up on each forming assembly so as to pinch or hold the picked-up strip on the forming assembly as it is rotated into successive zones wherein the dough strip ends are curled about the mandrel and the strip is formed into a toroid between the mandrel and sleeve due to drawing of the mandrel through the sleeve.

It is another object of the present invention to disclose and provide an apparatus as in the foregoing object wherein means are provided for partially retracting the mandrel relative to the associated sleeve to draw a first curled free end of the dough strip inwardly of the forming assembly prior to the curling of the second free end about the mandrel so as to curl the ends in an overlapping relationship with each end being curled against the mandrel.

It is another object of the present invention to disclose and provide in an apparatus for quickly converting strips of pliant material into toroids, a means for facilitating the release of the formed toroids from the forming sleeves in the event the toroid tends to adhere to inner portions of the forming sleeve during release in the discharge zone.

Further objects and various advantages of the present invention will become apparent to those skilled in the art from a consideration of the following detailed explanations of a first examplary embodiment and an alternative exemplary embodiment of the apparatus of the present invention. Reference will be made to the appended sheets of drawings in which:

FIG. 1 is an elevational view of an exemplary apparatus for quickly converting strips of pliant material, such as dough, into toroids, according to the present invention;

FIG. 2 is a plan view of the apparatus of FIG. 1;

FIG. 3 is a prospective view of an exemplary annulus or toroid formed out of a strip of dough by the exemplary embodiment of FIGS. 1 and 2;

FIG. 6 is a detail view of a portion of a forming assembly of the apparatus of FIG. 1;

FIG. 7 is a section view of the apparatus of FIG. 6 taken therein along the plane VII—VII;

FIG. 8 is a plan representation of the movement of forming assembly through the plane VIII—VIII of the apparatus of FIG. 4;

FIG. 9 is a detail view of a portion of the apparatus of FIG. 8 taken therein along the plane IX—IX;

FIG. 10 is a detail view of a portion of the apparatus of FIG. 1;

FIGS. 11 and 12 are detail views of the apparatus of FIG. 10;

FIG. 13 is a detail view of the apparatus of FIG. 1;

FIG. 14 is a detail view of the apparatus of FIG. 13;

FIG. 19 is a detail view of a portion of the apparatus of FIG. 1 taken therein along the plane XIX—XIX;

FIG. 20 is a section view of the apparatus of FIG. 19 taken therein along the plane XX—XX;

FIG. 21 is a detail view of the apparatus of FIG. 20 taken therein along the plane XXI—XXI;

FIG. 22 is a detail view of the apparatus of FIG. 21 taken therein along the plane XXII—XXII;

FIG. 23 is an elevational view of an alternative exemplary embodiment of the apparatus for quickly converting strips of pliant material such as dough into toroids according to the present invention;

FIG. 24 is a detail view of a forming assembly of the apparatus of FIG. 23;

FIG. 25 is a plan view of a portion of the apparatus of FIG. 23 taken therein along the plane XXV—XXV;

FIG. 26 is a section view of the apparatus of FIG. 25 showing the mandrel partially retracted; and FIG. 27 is a detail view of the forming assembly of the apparatus of FIGS. 23 and 25 with the mandrel further retracted into the sleeve.

A detailed explanation of exemplary embodiments of the apparatus for quickly converting strips of pliant material, such as dough, into homogenous, coherent and toroids, as seen in FIG. 3, will now be made.

Figure 4:
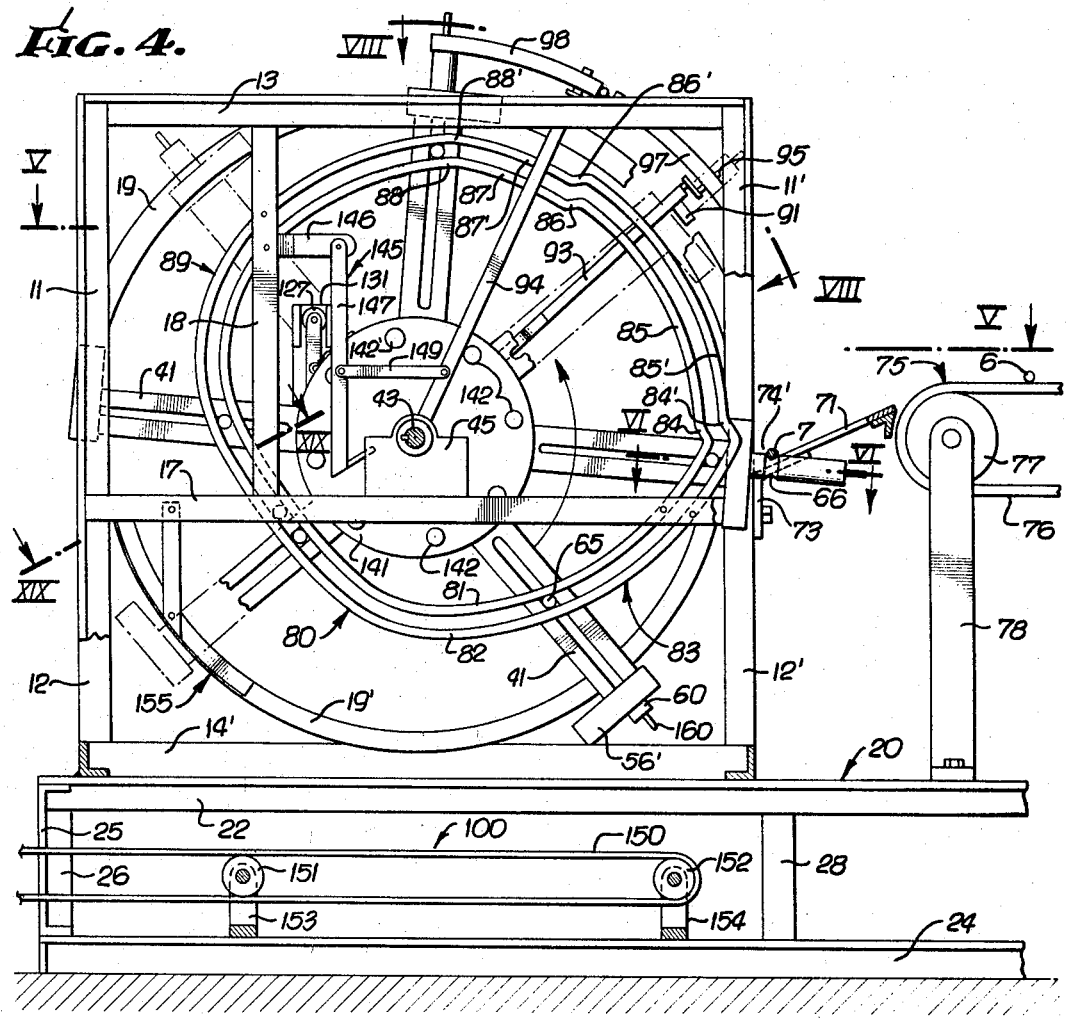
FIG. 4 is a partially sectioned elevational view of the apparatus of FIG. 1.

Referring first to FIGS. 1 through 5, it can be seen that in the exemplary embodiments of FIGS. 1 through 22 a plurality of forming assemblies, indicated generally at 50, are radially mounted upon a frame assembly, indicated generally at 10. The frame assembly is mounted upon a base, indicated generally at 20. Motor means, indicated generally at 30, are provided to drive the assembly mounting means, indicated generally at 40. Strips of pliant material, such as dough, are fed to a feeding station on the frame assembly, indicated generally at 70, by a conventional feeding means, indicated generally at 75. As seen in FIG. 4, as each forming assembly rotates upwardly past the feeding station, it picks up a strip of pliant material, preforms it into a generally U-shape and carries it along thereon. During rotation of the forming assembly the strip of pliant material is curled about a mandrel of the assembly and formed into a toroid upon drawing of the mandrel through the associated sleeve. The formed toroid is released or discharged from the apparatus at a lower portion of the apparatus in a discharge zone indicated generally at 100.

Figure 5:
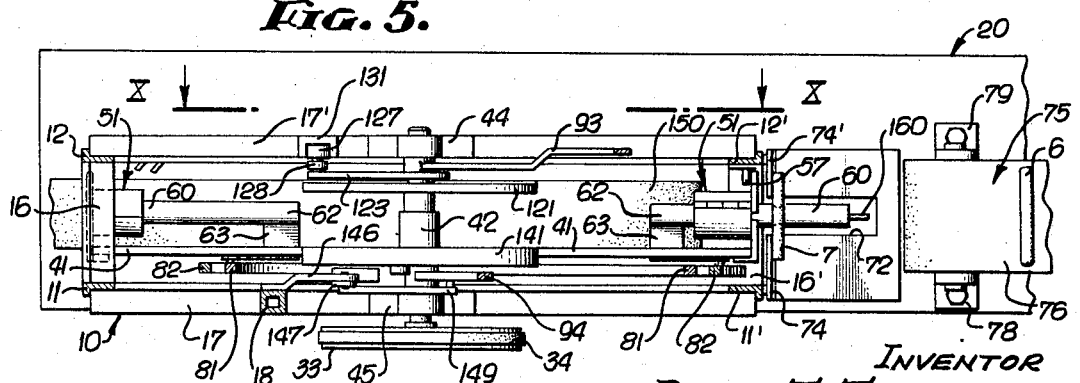
FIG. 5 is a section view of the apparatus of FIG. 4 taken therein along the plane V—V.

Each of the forming assemblies, indicated generally at 50, includes a forming sleeve and a mandrel which are axially movable relative to one another to compact and form a strip of pliant material therebetween into a toroid. As best seen in FIGS. 4, 5 and 6, each such forming assembly in the exemplary embodiment includes a forming sleeve 51 and a mandrel 60. Each sleeve 51 includes semi-cylindrical portions 52 and 53 joined by a hinge 54. Sleeve sections 52 and 53 are opened upon the associated hinge 54 at the discharge zone, indicated generally at 100, in order to release or discharge the toroid as hereinafter explained.

Mounting means are provided for radially mounting each of the forming assemblies, indicated generally at 50, in a generally planar array for concurrent rotation about a common axis. In the exemplary embodiment, the forming assemblies are mounted for rotation in a generally vertical plane about a generally horizontal axis. As seen in FIGS. 1 through 5, each forming assembly, including a forming sleeve 51 and an associated mandrel 60, is mounted upon a radial support arm 41 which in turn is secured to a hub 42 rotatably mounted upon a generally horizontal axis 43. The axis 43 is journaled in a pair of spaced opposed journal blocks 44 and 45, respectively, mounted upon the apparatus frame, indicated generally at 10.

Means for rotating the forming assemblies repetitively through the feeding station and forming and discharge zones in succession are provided. In the exemplary embodiment, such means for providing rotation to the plurality of assemblies includes the motor means, indicated generally at 30 operably connected to the main shaft or axis 43 upon which the assemblies are mounted. As seen in FIGS. 1 and 2, motor 31 drives a drive sheave 32 which in turn drives a larger driven sheave 33 by means of the drive belt 34. The large driven sheave 33 is fixed upon the main shaft or axis 43 to rotate shaft 43 upon operation of the motor 31. Each of the forming assembly support arms 41 is radially mounted to the hub 42 which in turn is fixed non-rotatably upon the shaft 43 to rotate therewith.

The apparatus frame includes front corner posts 11, 11', rear corner posts 12, 12', spaced top rails 13, 13', bottom rails 14, 14', top cross rails 15, 15' and bottom cross rails 16, 16'. Cross members 17, 17' extend generally horizontally between the corner rails 11 and 11' and 12 and 12', respectively. Cross members 17, 17' are provided for mounting the journal blocks 45 and 44, respectively, in positions to place main shaft or axis 43 in the approximate middle of the generally rectangularly shaped frame, indicated generally at 10. These posts, rails and members may be made out of conventional angle iron stock or any other suitable framing material.

Base means, indicated generally at 20, may be provided for mounting the apparatus frame above a discharge zone, indicated generally at 100, and adjacent a means for feeding strips of pliant material, indicated generally at 75, the feeding station, indicated generally at 70, which is mounted at one edge of the frame. Such base means in the exemplary embodiment includes front and back top members 21 and 22, respectively, front and back bottom members 23, and 24, respectively, vertical corner members, as corner members 25 and 26, and intermediate front and back vertical support members 27 and 28.

Means for feeding a strip of pliant material, such as dough, to the feeding station, indicated generally at 70, may comprise a conventional conveyor belt assembly, as indicated generally at 75. In the exemplary embodiment, such means for feeding include a continuous conveyor belt 76 mounted about a pair of sheaves, as sheave 77, which in turn are mounted upon vertical standards, such as vertical standards 78 and 79.

A strip of pliant material, such as dough strip 6 as seen in FIGS. 1 through 5, may be fed upon the conveyor belt 76 to the positioning means at the feeding station, indicated generally at 70. Such positioning means in the exemplary embodiment includes a plate 71 having a center slot 72 through which each mandrel 60 of the plurality of forming assemblies may pass, as seen in FIGS. 4 and 5.

Plate 71 is mounted to hte apparatus frame adjacent one edge of the vertical plane defined by the plurality of forming assemblies at about the level of the axis 43 by spaced angle brackets 73 and 73'. Brackets 73, 73' are bolted to the apparatus frame vertical corner posts 11' and 12', respectively, to mount plate 71 inclined to and traversely of the vertical plane of the forming assemblies. The lower ends of the plate 71 on either side of the slot 72 are provided with upturned flanges or stop means 74 and 74' to position a strip of pliant material, such as dough strip 7, traversely of slot 72 ready to be picked up by the mandrel of a forming assembly as it passes upwardly through the slot 72.

As seen in FIG. 7, the dough strip 7 positioned across the path of travel of the mandrel 60 at the feed station is picked up by the mandrel, being received in a strip receiving groove 66 (see FIG. 4). The passage of the mandrel through the feed station with the dough strip positioned traversely of the mandrel travel causes the dough strip 7 to be preformed into a U-shape and be carried along with a bight portion 8 of the dough strip seated in mandrel groove 66.

Each sleeve 51 of the forming assemblies, as best seen in FIG. 6, is mounted to the associated radial support arm 41 by an angle plate 56' secured to the free end of arm 41 by conventional fasteners, such as screw 55, extending through a top flange 56. Sleeve section 53 is secured to the flange 56, as by welding, leaving the other sleeve section 52 free to swing upon hinge means 54 away from the associated mandrel 60 in a manner subsequently described during the release or discharge operation.

Each mandrel 60 is slidably mounted to the associated support arm 41 for the assembly by means of a foot section 61 interconnected with a lower end 62 of the mandrel by a web 63. Foot member 61, web 63 and mandrel 60 may be cast integrally or be fabricated out of separate parts fastened together by conventional means, such as welding. Each foot member 61 of a forming assembly mandrel 60 is slidably mounted to the associated support arm 41 within a slot 64 extending longitudinally within the arm 41. Movement of foot member 61 longitudinally of the support arm 41 provides relative axial movement between the mandrel 60 and sleeve 51 to form a strip of pliant material positioned therebetween into a toroid.

Means for operating each of the forming assemblies, indicated generally at 50, are provided to form a picked-up strip of pliant material, such as dough, into a toroid, as shown in FIG. 3, during rotation of each assembly from the feeding station, indicated generally at 70, to the discharge or release zone, indicated generally at 100. This forming of the individual strips into toroids is generally accomplished in a forming zone generally opposite the feed station and above the level of the axis 43 with a release operation being started approximately when the forming assembly passes below the level of the axis 43.

In the exemplary embodiment, such means for operating each of the forming assemblies to form a picked-up strip of pliant material, such as dough strip 7, into a toroid includes track or spaced cam means, indicated generally at 80, and cooperating roller means on each forming assembly which ride within the track means during rotation of each forming assembly between the feeding station, indicated generally at 70, and the discharge zone, indicated generally at 100. The cooperating roller means in the exemplary embodiment includes a roller 65 mounted to the foot member 61 of each assembly.

Spaced track ways or cam ways 81 and 82 are supported along one side, the front side in the exemplary embodiment, of the frame assembly indicated generally at 10. As seen in FIGS. 1 and 4, track ways 81 and 82 are mounted upon the frame cross member 17 and an additional vertical frame member 18 extending between the cross member 17 and top front rail 13. As each forming assembly is rotated about the common axis 43, its mandrel 60 is moved axially relative to the associated sleeve 51 due to the camming action of the track ways upon the associated pinion or wheel 65 traveling between and being moved longitudinally of the arm 41 by the track ways 81 and 82.

Means are provided for extending each of the mandrels 60 of the forming assemblies through its associated sleeve 51 in a zone between the discharge zone, indicated generally at 100, and the feeding station, indicated generally at 70. This allows extension or projection of the mandrel from the sleeve to pick up a strip of pliant material positioned on the feeding station plate 71.

As seen in FIG. 4, such means for projecting the mandrel from its associated sleeve in the exemplary embodiment includes a portion, indicated generally at 83, of the track way or cam way means, indicated generally at 80. The track ways or cam ways 81 and 82 from a point approximately directly below axis 43 describe approximately 90° arcs, with an ever-increasing radii, upwardly and to the right in FIG. 4 to the level of the feeding station which is approximately at the level of axis 43. As each forming assembly is rotated from the discharge zone, indicated generally at 100, upwardly and to the right in FIG. 4 to the feeding station, the roller means 65, interconnected with the associated mandrel 60, is guided or cammed radially outwardly of axis 43. This is due to the increasing radii of the cam ways or track way portion, indicated generally at 83.

The radially outward, projecting movement of the roller 65 causes the associated mandrel 60 to be extended or projected outwardly of the associated sleeve to position the mandrel and its strip receiving groove 66 to contact and pick up a strip, as dough strip 7, at the feeding station. As seen in FIG. 7, the projected or extended mandrel 60 travels upwardly through slot 72 in the feeding station plate 71 to contact a central portion of the dough strip 7 positioned upon the plate 71. The dough strip 7 is thereby preformed into a generally U-shape with a bight portion 8 positioned on the mandrel in groove 66 and strip free ends 9, 9' of approximately equal length extending downwardly on either side of the mandrel.

As the strip of pliant material, as dough strip 7, is picked up and carried upwardly upon the forming assembly mandrel, it is held in position upon the mandrel in its preformed U-shaped preparatory to the forming operation by means for pinching or holding the bight portion 8 on the associated mandrel and in the mandrel groove. Such means, in the exemplary embodiment of FIGS. 1 through 22, include portions of the mandrels, sleeves and the cam way or track way means for operating the forming assemblies to form each dough strip into a toroid. As seen in FIG. 4, the cam or track ways 81 and 82, at the end of the arcuate portion indicated generally at 83, and at a position closely spaced above the feeding station where the dough strip is picked up, are sharply inwardly directed or inclined. Such inwardly directed spaced cam or track way portions 84 and 84', respectively, cam the roller means 65 of each forming assembly to partially retract the associated projected mandrel relative to its associated sleeve. Such partial retraction of mandrel 60 draws inwardly and pinches the bight portion 8 of dough strip 7 between an outer edge portion of sleeve 51 and an opposing portion of the mandrel 60. The bight portion 8 of the strip is thus held between opposed portions of the sleeve and mandrel. The following track way portions 85 and 85' are of generally constant radii to maintain the mandrel and sleeve of the forming assembly in constant relative positions on each assembly during a first curling operation as hereinafter described.

Curling means are provided for curling or forming the free ends of the strip of pliant material picked up and carried upon the forming assembly prior to drawing the mandrel through its associated forming sleeve. In the exemplary embodiment, the strip of pliant material, dough strip 7, is picked up, preformed into a generally U-shape with free ends 9 and 9' trailing below the mandrel and held on the assembly by its bight portion 8. As shown in FIG. 8, as the forming assembly travels along the arcuate portion defined by track way sections 87 and 87' a first free end 9' is curled about the associated mandrel 60. The curling means for curling the free ends of the preformed generally U-shaped strip about the associated mandrel into curled contact, in the exemplary embodiment, includes a plurality of curling fingers or forming elements in the forming zone.

Curling means, in the exemplary embodiment of FIGS. 1 through 21, include the curling fingers 91 and 92, as best seen in FIG. 8, which successively operate upon each forming assembly as it passes by to curl the free ends 9, 9' of a dough strip about the forming assembly mandrel. Mounting means are provided for mounting each of the curling fingers or forming elements 91 and 92 on opposite sides of the forming assemblies and adjacent a portion of their travel about the apparatus. As best seen in FIGS. 1, 4, 9 and 12, the curling or forming elements 91 and 92 are mounted upon arms 93 and 94, respectively, which are pivotally mounted upon the main shaft or axis 43 of the apparatus. The arms 93 and 94 are moved about their pivot axes, axis 43, as each forming assembly is rotated by each of the forming elements or curling fingers 91 and 92 being successively actuated to curl an end of the strip about the assembly mandrel due to the movement of associated cam rollers 95 and 96 moving within cam ways 97 and 98, respectively.

Referring to FIGS. 8, 9 and 10, the rear and first curling finger or forming element 91 is mounted upon a first curling means assembly including arm 93, pivoted upon the main axis 43. A member 101 extends laterally outward from the top free end of arm 93 and mounts a pin 102, journaled in a bearing member 103 supported by member 101. Curling finger or element 91 is fixed upon the lower end of rod or pin 102. A lever 104 is fixed to the upper end of pin 102 to rotate with pin 102 and curling finger or element 91.

Upon movement of arm 93 in a clockwise direction in FIG. 10 and upwardly in FIG. 8, the finger or element 91 is rotated from the starting position in solid line in FIG. 8 to the operated position shown in phantom line in FIG. 8 due to camming of the associated cam roller 95 within the cam way 97. Cam way 97 is mounted to the frame adjacent the path of travel of the assemblies and the first curling assembly by the plate 105. The cam way 97 may be welded, as shown, to plate 105 which may be mounted to the vertical corner post 12' or other suitable frame member in any conventional manner.

The forward or second curling finger or forming element 92 is mounted upon a second curling assembly including the arm 94, pivotally mounted on the main axis 43. A member 111 extends laterally from the upper free end of arm 94 and mounts the finger 92 and lever 113 on a pivot pin 112 in the same manner as in the first assembly of FIG. 9. The lever 113 interconnects the cam roller 96 with the curling finger 92 through the pivot pin 112 to rotate the finger or forming element 92 from the starting position shown in solid line in FIG. 8 to the operated position shown in phantom line. Lever 113 is rotated by the cam roller 96 as roller 96 is moved along the cam way 98 by movement of arm 94 clockwise in FIGS. 1 and 4 and counter-clockwise in FIG. 13. Cam way 98 may be mounted to the frame at cross member 13 by conventional means, as by welding to a bar 114 which in turn may be welded to the frame top cross member 13.

Means are provided for successively rotating the arms 93 and 94 to actuate the associated curling fingers or elements and for thereafter positively returning each of the curling means assemblies to their starting positions after the associted curling fingers or forming elements 91 and 92 have been operated to curl the strip ends 9, 9' around the mandrel 60.

Means for operating or actuating the curling means, including the curling fingers 91 and 92, are provided which are actuated by the passing of the forming assemblies through the forming zone. In the exemplary embodiment, referring particularly to FIGS. 10, 11 and 12, the first curling means assembly arm 93 is rotated clockwise in FIG. 10 as each forming assembly passes by. A plurality of cam means, indicated generally at 120, are mounted upon a plate 121 fixed to and rotated with the main shaft or axis 43 of the apparatus. Plate or disc 121 thus rotates in unison with the plurality of forming assembly arms 41. Each of the cam means, indicated generally at 120 mounted upon the plate 121, includes a first cam portion 122 which functions to operate or actuate the associated curling means assembly arm 93.

As seen in FIG. 10, each curling assembly arm 93 is connected by a link 123 to a second link 124 by the pivotal connections 125 and 126. The second link 124 connects an upper pivotally mounted roller 127 and a lower pivotally mounted roller 128 to each other and to the associated arm 93 through the first link 123. The upper roller 127 is constrained between vertical spaced guides 129 and 130, mounted on a standard 131 supported from the frame cross bar 17'. Roller 127 is thus constrained to movement only in a vertical direction.

As each forming assembly approaches the forming zone and the first curling means cam way 97, as shown in FIG. 10, the associated cam 122 contacts the lower roller 128 of link 124 and moves it downwardly and outwardly from the starting position of FIG. 10 to the operated position of FIG. 11. Such downward camming movement of roller 128 is transmitted by the links 124 and 123 to the associated arm 93 to cause forward rotation of arm 93 in a curling means actuating movement (clockwise in FIGS. 10 and 11). As arm 93 approaches the end of the associated curling means cam 97, as shown in dotted line in FIG. 10, the movement of arm 93 is reversed and the arm is positively returned to its starting position as shown in FIG. 12.

In order to return the arm 93 of the first curling means assembly to its start position of FIG. 10 from the fully rotated or operated position of FIG. 11, each of the cam means, indicated generally at 120 on the plate 121, includes a pair of spaced opposed cam walls 132 and 133. As seen in FIG. 11, as the roller 128 rolls over the end of the passing first cam wall 122, it abuts the outer cam wall 132 and is forced between walls 132 and 133 in an upward and inward direction (roller 127 moving vertically between guides 129 and 130). The arm 93 is thereby reversed and rotated in a counter-clockwise direction, as seen in FIG. 12, back to its starting position as the forming assembly arm 41 and plate 121 continue to rotate clockwise.

As the next successive forming assembly arm 41 approaches the position shown in FIG. 10, the next associated cam means on plate 121 actuates arm 93 to repeat the above described curling means operating or actuating movement in a clockwise direction in FIG. 10 and thereafter the positive return movement from the position of FIG. 11 to that shown in FIG. 12.

After the first curling means assembly including the arm 93 and associated curling finger or element 91 have curled a first end 9' of the dough strip 7 about the mandrel 60, as previously explained and as shown in FIG. 8, the continued counter-clockwise rotation of the forming assembly in FIGS. 1 and 4 brings the forming assembly into alignment with the second curling means assembly including the arm 94, curling finger 92 and associated cam way 98. By this time, the mandrel had been retracted to pull or draw the first free end 9' and the bight portion 8 of the dough strip inwardly of the associated sleeve due to the forming assembly roller 65 being cammed radially inwardly of the apparatus by the inwardly inclined portions 86 and 86' of the cam or track ways 81 and 82. The second curling operation, as seen in FIG. 8, thereafter curls the second free end 9 of the dough strip 7 about the mandrel overlapping the first free end 9' which has been drawn inwardly of the sleeve 51.

Figure 15:
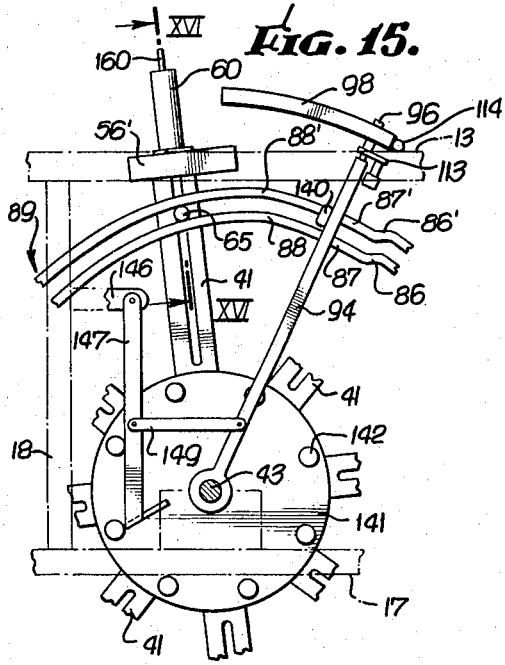
FIG. 15 is a detail view of the apparatus of FIGS. 1 and 13.

Referring particularly to FIGS. 13, 14 and 15, the means for operating or actuating the second curling means assembly, including the arm 94, in the first exemplary embodiment is shown in a starting position in FIG. 13, in an operating position in FIG. 14, and in a returned position in FIG. 15. The exemplary means for actuating the second curling means assembly includes a strike bar or pad 140 mounted upon the second curling means arm 94.

As each forming assembly is rotated in a counter-clockwise direction in FIG. 13, its associated roller 65 abuts or contacts the strike bar or pad 140 mounted on the arm 94. As the roller 65 strikes pad 140, the second curling means assembly 94 is carried along with the rotating forming assembly. The curling means assembly curling finger 91 is thus actuated due to the camming movement of roller 96 within the associated cam way 98.

When the forming assembly arm 41 and curling means assembly arm 94 approach the end of the cam way 98, the roller 96 is released from the strike plate 140. Roller 65 is cammed under the strike plate 140, to release the arm 94, by the bend or break 88 and 88' in each cam way 81 and 82, respectively. At the bend or break in the cam ways 81 and 82 thus provided, the roller 65 which has been moving on the constant radii portions 87 and 87' is cammed radially inwardly to draw the associated mandrel 60 through the associated sleeve.

The following cam way portions, indicated generally at 89, of the cam ways or track ways 81 and 82, are provided with an ever-decreasing radii so that the mandrel of each forming assembly as it passes through this portion of the forming zone is drawn through its associated mandrel to form the dough strip into a toroid. It is preferred that the drawing of mandrel 60 through the sleeve 51 by the bend or break provided by cam portions 88 and 88' be begun while the second curling finger 92 is retained in its operative position, as shown in dotted line in FIG. 8, so that the overlapped second free end 9 of the dough strip is drawn into the sleeve between it and the associated mandrel 60 prior to its being released by the finger or element 92.

When the second curling means assembly arm 94 is released from each passing forming assembly by the camming of the roller 65 under the pad 140 on arm 94, means for positively returning arm 94 to its starting position are operated. In the exemplary embodiments of FIGS. 1 through 22, and particularly as shown in FIGS. 12 through 15, such means includes a plate 141 mounting a plurality of studs 142 which act upon a linkage, indicated generally at 145. Plate 141 is mounted on and rotated with the main shaft or axis 43 of the apparatus. Each of the plurality of studs 142 is mounted upon plate 141 to function in cooperation with one of the forming assembly arms 41. As seen in FIG. 14, the stud 142' is positioned on plate 141 to cooperate with the particular forming assembly arm 41 shown contacting the second curling means assembly arm 94. An arm 41 is rotated counter-clockwise in FIG. 14 on main shaft 43, the plate 141 rotates bringing the stud 142' into contact with the linkage indicated generally at 145.

The linkage, indicated generally at 145, includes a fixed arm 146 extending laterally from the frame vertical member 18 to pivotally support a pendulum arm 147. An inclined plate or ramp 148 is mounted at the lower end of the pendulum arm 147 to be contacted by each of the studs 142 as they pass by. Movement imparted successively to pendulum arm 147 by each of the studs 142 is conveyed to the arm 94 through link 149 pivotally connected therebetween. As arm 94 is moved in its curling means actuating rotation from the position shown in solid line to that shown in dotted line in FIG. 13, the associated linkage, indicated generally at 145, is moved into the position shown in FIG. 14 ready to be operated to return arm 94 to its starting position. As shown in FIG. 14, continued clockwise movement of the forming assemblies and plate 141 brings the associated stud 142' into contact with the inclined ramp 148. As the stud 142' is moved down the inclined ramp 148, it forces the ramp and associated pendulum arm 147 to move in a counter-clockwise pivotal movement into the position shown in FIG. 14. Such movement of arm 147, translated through the link 143, positively returns the arm 94 to its starting position ready for the next forming assembly to come by, strike pad 140 and move arm 94 in its forward curling means actuating movement.

Figure 16:
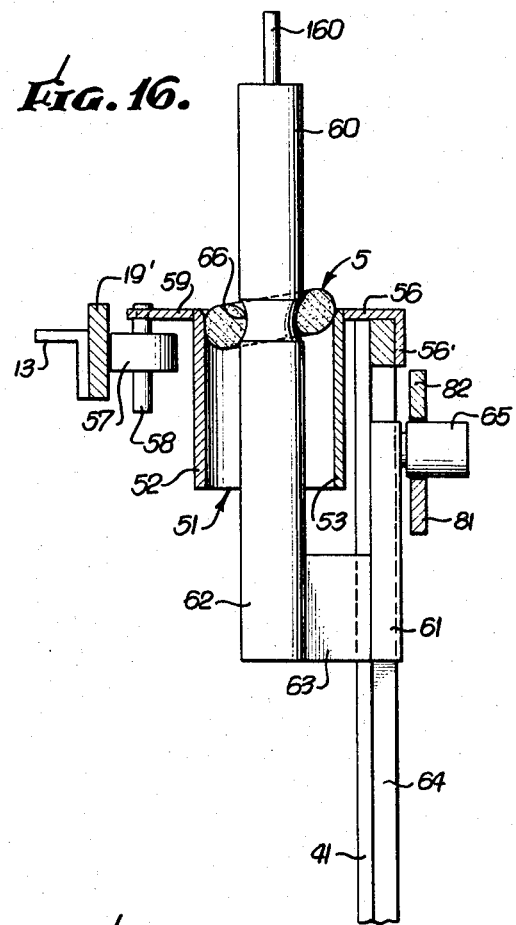
FIG. 16 is a detail view of a forming assembly of the apparatus of FIG. 15 taken therein along the plane XVI—XVI.
Figure 17:
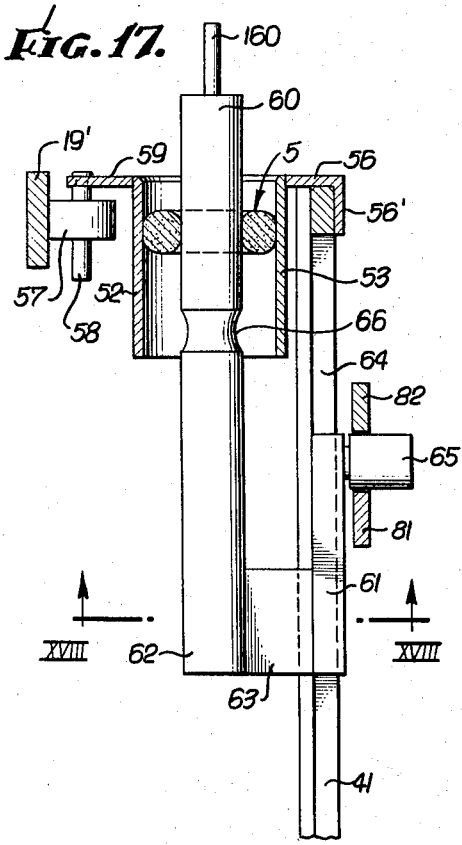
FIG. 17 is a detail view of the forming assembly of FIG. 16 after the mandrel has been further retracted or drawn into the sleeve assembly.
Figure 18:
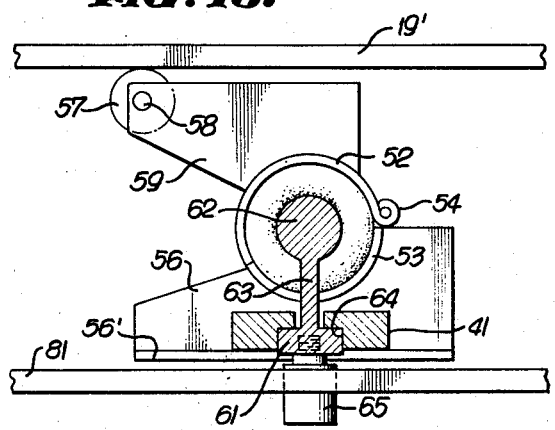
FIG. 18 is a section view of the apparatus of FIG. 17 taken therein along the plane XVIII—XVIII.

As each forming assembly is rotated past the second curling means assembly and its mandrel is drawn through the associated sleeve by the camming action of cam ways 81 and 82 acting on roller 65 in the portion thereof indicated generally at 89 (FIG. 15), the dough strip, having its ends overlapped and partially drawn into the sleeve as seen in FIG. 16, is formed into a toroid, as indicated generally at 5 in FIG. 17. As the forming assemblies rotate about axis 43 within the frame, indicated generally at 10, additional lateral stability is provided by the arcuate spaced guide bars or angle irons 19 and 19'. Each forming assembly is provided with a roller 57 which may bear against guide 19'. Each roller 57 is rotatably mounted by a pin 58 to the flange 59 provided on each semi-cylindrical sleeve portion or section 52, as seen in FIG. 18.

Means for releasing each formed toroid from its associated forming assembly are provided so that when each assembly is rotated into an inverted position, as seen in FIG. 19, the toroid is dropped away from the inverted assembly in a direction away from the assembly mandrel. Such means for releasing each formed toroid operates to cause the release of the toroids in the discharge zone, indicated generally at 100 in FIGS. 1 and 4, so that the toroids may be dropped upon a conveyor belt 150. As seen in FIGS. 1 through 5, the conveyor belt 150 may be mounted below the forming assemblies on sheaves 151 and 152 supported in conventional manner upon standards 153 and 154, respectively.

The means for releasing each toroid from its associated sleeve after withdrawal of the mandrel 60, as seen in FIG. 21, includes a cam guide, indicated generally at 155, through which each sleeve roller 57 passes. As seen in FIG. 20, as each forming assembly is rotated into an inverted position, its associated roller 57 enters the track way, indicated generally at 155, between the spaced opposed track ways 156 and 157. On continued rotation of the assembly, roller 57 is cammed outwardly between the track ways 156 and 157 to swing the associated flange 59 and sleeve section 52 away from section 53 upon the hinge 54, as seen in FIG. 22. Such openings of the sleeve sections upon their hinge 54 will normally release the toroid indicated generally at 5.

Where the strip of pliant material to be formed into a toroid tends to adhere to the inner surfaces of the sleeves 51, the toroid, indicated generally at 5 in FIG. 22, will tend to adhere to the larger sleeve section 52 as it is swung away from the smaller section 53. In order to facilitate the release of the toroid adhering to such larger sleeve section 52, an elongate finger, or removal or release rod 160 is provided on the outer free end of each mandrel 60. Release rod or elongate member 160 is preferably centered on and extends axially from the rod 60 to be normally centered in the central opening of the toroid after the mandrel 60 has been withdrawn from within the toroid. As seen in FIG. 22, as the sleeve section 52 is rotated outwardly on its hinge 54 carrying the toroid with it, the rod or member 160 will be contacted by an inner surface of the toroid causing release of the toroid from the larger section 52.

Referring now to FIGS. 23 through 27, an alternative exemplary embodiment of the apparatus for quickly converting strips of pliant material, such as dough, into homogeneous, coherent and seamless toroids will be explained. In this explanation of the alternative exemplary embodiment, it should be understood that the construction of the frame assembly, indicated generally at 10; base means (not shown); mounting means for radially mounting each of the forming assemblies, indicated generally at 40; means for rotating the forming assemblies repetitively through the feeding station and forming and discharge zones in succession; means for feeding, indicated generally at 75, a strip of pliant material to a feeding station, indicated generally at 70; the mandrels of the forming assemblies; the means for operating each of the forming assemblies including the spaced track ways or cam ways 81 and 82; the means for extending each of the mandrels 60 of the forming assemblies through its associated sleeve 51 in a zone between the discharge zone, indicated generally at 100, and the feeding station, indicated generally at 70; and the means for releasing each formed toroid from its associated forming assembly are all identical to that employed and as previously explained and disclosed in relation to the first exemplary embodiment of FIGS. 1 through 22. Parts similar to the two embodiments bear the same numerals.

The principal difference in the construction of the alternative exemplary embodiment from that in the first exemplary embodiment is in the curling means for curling the ends of the dough strip 7 about the forming assembly mandrels 60 and the means for operating or actuating such curling means. In this alternative exemplary embodiment, the curling means include a pair of curling fingers or elements 200 and 201 mounted on the outer end of each forming assembly indicated generally at 50.

Each curling means in the alternative exemplary embodiment, as best seen in FIG. 25, includes a pair of spring biased curling fingers or elements 200 and 201 mounted on each of the forming assemblies. The curling fingers or elements 200 and 201 are each pivotally mounted upon pin 202, which may be part of the hinge means 203 of the separable sleeve sections 204 and 205. Springs 206 and 207 bias the fingers or elements 200 and 201 outwardly away from the mandrel 60. As seen in FIG. 25, each finger 200 and 201 has a laterally extending arm 208 and 209, respectively, mounted thereon adjacent the pivoted end of the finger or element to which the springs 206 and 207 are connected. The other ends of each of springs 206 and 207 are fastened to the forming assembly flanges 210 and 211, respectively, which are mounted on the assembly arms 41 as in the prior exemplary embodiment.

As each forming assembly is rotated past the feeding station, indicated generally at 70, it picks up a strip of pliant material, such as dough strip 7, preforming it into a generally U-shape and carrying it along on the assembly, as in the first exemplary embodiment. The bight portion 8 of the dough strip 7 is secured between a portion of the sleeve and the mandrel due to the forming assembly roller 65 being cammed inwardly between the track way portions 84 and 84'. A radially outwardly extending flange 212, as seen in FIG. 24, may be provided to facilitate pinching the bight portion 8 of dough strip 7 between the mandrel and the sleeve. Flange 212 in this alternative exemplary embodiment may be provided in two sections, each section being mounted on one of the sleeve sections 204 and 205, as seen in FIG. 25. Further counterclockwise rotation of each forming assembly in FIGS. 23 and 24 carries the picked-up dough strip upwardly toward the forming zone indicated generally at 215.

Means for operating or actuating the curling means, in the alternative exemplary embodiment, include the provision of stationary abutment means upon the frame assembly against which the curling fingers or elements abut as they pass by successively. As best seen in FIGS. 23 and 25, a first abutment means includes a roller 216 mounted upon a stationary bearing or journal block 217. The bearing or journal block 217 may be fastened to the frame assembly corner post 11' in any conventional manner, such as welding. As each forming assembly is rotated past the roller 216, its associated first curling finger or element 200 abuts the roller 216 and is thereby forced inwardly against its spring bias to curl the first end 9' of dough strip 7 about the mandrel 60. The curling finger or element 200 and strip end 9' preferably are held curled around mandrel 60 until the associated mandrel 60 is partially retracted relative to the sleeve sections 204 and 205 so that strip end 9' is drawn inwardly of the sleeve sections between the sleeve and mandrel.

The inward drawing or retraction of mandrel 60 in this embodiment is accomplished, as in the first exemplary embodiment, by the assembly roller 65 being cammed inwardly by cam way or track portions 86 and 86'. In order to maintain the curling finger 200 in its curled position, shown in solid line in FIG. 25, during such retraction of mandrel 60, means are provided on the finger element 200 for maintaining abutting contact with the roller 216 as the assembly passes by. Such means include the provision of an extension or angle plate member 218, fastened to the finger 200, as by welding. Another means for prolonging the abutting contact between the finger element 200 and the stationary abutment means would be to provide more than one roller 216 or a stationary cam surface. Strip end 9' is then released by finger element 200 after it has been partially withdrawn or pinched between the mandrel and sleeve. This position of the partially retracted mandrel with both the bight portion 8 and strip end 9' drawn inwardly of the sleeve, including sections 204 and 205, is best seen in FIG. 24 in solid line.

A second abutment means includes the roller 226 mounted upon the stationary bearing or journal block 227, as best seen in FIG. 25. The bearing or journal block 227 may be fastened to the frame assembly top cross bar 13 in any conventional manner, as seen in FIG. 23, as by welding.

As each forming assembly, after having rotated past the first abutment means including roller 216, continues onward past the second abutment means roller 226, the second curling finger or element 201 is actuated. The abutment between roller 226 and curling finger 201, as best seen in the upper portion of FIG. 25, causes finger or element 201 to move inwardly against its spring bias to curl the strip second free end 9 about the associated mandrel above and in overlapping relationship to the first free end 9'. Curling finger or element 201 is preferably held curled around the mandrel until the mandrel is further retracted in order to draw the curled overlapped free end 9 into the sleeve, prior to its being released by the curling finger.

The means for prolonging the abutting contact between finger element 201 and the abutment means roller 226, in this alternative exemplary embodiment, includes the provision of the extension or angle plate member 228, mounted to the finger 201, as shown in FIG. 25. As in the case of extension 218, this extension could be formed integrally with the finger element or assembled to it. A similar prolonged abutment between the finger element and the abutment means could be effected by providing more than one roller 226 or by providing an extended cam surface to be abutted by the finger element 201.

As best seen in FIG. 23, the cam way portions 88 and 88' form a break or change of direction in the cam ways causing the initiation of the toroid forming withdrawal or full retraction movement of mandrel 60 prior to the complete release of the strip free end 9 by curling finger or element 228. Thereafter, the toroid is formed between the mandrel and sleeve sections in the forming zone, as best seen in FIG. 27, and is released at the discharge zone as in the prior exemplary embodiment.

From the foregoing detailed description of two exemplary embodiments of the apparatus for converting strips of pliant material, such as dough, into toroids, it can be seen that the objects sought to be accomplished have been attained by the present invention. The handling and working of the strips of dough has been reduced to a minimum. Each dough strip is preformed into a generally U-shape as it is picked up on a forming assembly and is held centered thereon by a pinching of a bight portion thereof between the assembly mandrel and sleeve. The strips are picked up at a feeding station adjacent the vertical plane defined by the path of forming assembly rotation and are formed in a forming zone due to the passage of the assemblies past cooperating means positioned in the forming zone. The strip ends are overlapped effectively by the combined effect of the curling means and the means for partially retracting the mandrel during the curling operations. The formed toroids are then easily released out at the top end of each assembly as it is rotated into an inverted position in the discharge zone. Such inversion of the forming assemblies at the release of the toroids allows the toroids to fall away from the mandrel and sleeve assembly without having to axially shift and disalign the mandrels and sleeves, as in the prior Patent 2,584,514. The positive release of each formed toroid from its associated forming sleeve is assured by the provision of release finger or element 160 on the end of each mandrel.

The preforming of each dough strip into a preformed, generally U-shaped is accomplished in the exemplary embodiments partially due to the movement of the mandrels through the feeding station and partially by the forces due to gravity acting on the dough strips. It is contemplated within the present invention that such preforming of the dough strips can be accomplished by dropping the dough strips directly upon the mandrels while they are moving, or stationary, as long as, in either event, they are preformed about the mandrels prior to the curling and forming operations.

While only two exemplary embodiments of the apparatus for converting strips of pliant material, such as dough, into toroids have been explained in detail herein, it should be understood that various other alternatives, modifications and adaptations of the apparatus may be made within the scope of the present invention, which is defined and limited only by the following claims.

I claim:

1. An apparatus for quickly converting strips of pliant material such as dough into toroids comprising:
   a plurality of forming assemblies, each of said assemblies including a forming sleeve and a mandrel movable axially relative to said sleeve;
   mounting means for radially mounting said assemblies in a generally vertical plane for concurrent rotation about a generally horizontal axis;
   means for feeding and positioning successive strips of said pliant material traversely of and in the path of travel of said assemblies to be picked up by and carried along on said assemblies;
   means for operating each of said forming assemblies to form a picked-up strip into a toroid during rotation of said assembly in said vertical plane; and
   means for releasing each said toroid from its associated forming assembly when said assembly is rotated into an inverted position to drop said toroid away from said inverted assembly in a direction away from said assembly mandrel.

2. In the apparatus of claim 1, the provision of:
curling means on each of said forming assemblies for curling the ends of a strip received thereon about the associated mandrel;
means for partially retracting said mandrel into the associated sleeve to pinch a mid-portion of said strip between said mandrel and an upper edge portion of said sleeve; and
means for operating said curling means after said partial withdrawing of said mandrel to curl said strip ends about said mandrel while said strip mid-portion is held between said mandrel and sleeve.

3. In the apparatus of claim 1, the provision of:
curling means for curling the ends of a strip received on a forming assembly about the associated mandrel; and
means for mounting said curling means adjacent a portion of the path of travel of each said forming assembly and for operating said curling means to curl the ends of each strip on each of the assemblies as they successively pass by said curling means.

4. The apparatus of claim 1 wherein:
said means for feeding is positioned adjacent a side edge of said vertical plane at the approximate level of said axis;
said means for operating each of said forming assemblies operates each of said assemblies in a forming zone above the level of said axis; and
said means for releasing operates each of said assemblies to release said toroids in a discharge zone below the level of said axis.

5. In the apparatus of claim 4, the provision of:
means for projecting each of the mandrels of said forming assemblies through its associated sleeve in an intermediate zone between said discharge zone and feeding station whereby each mandrel on upward rotation past said station picks up and carries along a strip of said pliant material and simultaneously imparts a U-formation to such strip.

6. In the apparatus of claim 4, the provision of:
curling means at said forming zone for curling the ends of each strip on each of said assemblies about the associated mandrel and into overlapping contact with each other; and
means for actuating said curling means to curl the strip ends of said strips passing through said forming zone on said assemblies in response to movement of said assemblies through said forming zone.

7. The provision of claim 6 wherein:
said means for operating said assemblies includes means for partially retracting each said mandrel relative to the associated sleeve to pinch a mid-portion of the strip thereon between said mandrel and sleeve while said curling means is actuated and thereafter relatively moving said mandrel and sleeve to compact and form said strip into a homogeneous toroid in response to movement of said assemblies through said forming zone.

8. The apparatus of claim 1 wherein each of said sleeves includes separable semi-cylindrical sections and said means for releasing each toroid from its associated forming assembly includes:
an elongate member projecting from a free end of the mandrel of said assembly;
means for withdrawing said mandrel from within said toroid within the assembly sleeve and for positioning said member within the central opening in said toroid left by said mandrel; and
means for moving at least one section of said sleeve sections away from said member to release said toroid, said toroid abutting said member to be separated from said one section whenever said toroid tends to adhere to said one section.

9. An apparatus for converting strips, or cylinders, of dough into virtually homogeneous, coherent toroids, comprising:
a plurality of forming assemblies mounted for concurrent rotation about a horizontal axis in a vertical plane;
each forming assembly including a forming sleeve and a mandrel movable axially through said sleeve;
a feeding station adjacent one side edge of said plane, said feeding station including means for feeding and positioning strips of deformable dough transversely across the upward path of travel of each assembly;
a forming zone above the level of the axis of rotation of said forming assemblies;
means for extending each of said mandrels through its associated sleeve in a zone between the discharge zone and feeding station whereby upward motion of each mandrel picks up a strip of dough at the feeding station and simultaneously imparts a U-formation to said strip;
forming elements in said forming zone arranged to fold the ends of a strip into contact with each other including means for retracting each mandrel with its folded strip of dough into the associated forming sleeve to compact the dough into a homogeneous toroid;
and means for withdrawing the madrel from its associated forming sleeve in the discharge zone to discharge the formed toroid by gravity;
and means for rotating said assemblies repetitively through said feeding station and forming and discharge zones in succession.

10. In an apparatus for converting strips of pliant material, such as dough, into toroids by forming the strips between relatively axially movable sleeve and mandrel assemblies including mounting means for mounting said assemblies for concurrent rotation about a common axis and means for producing relative axial movement between each mandrel and its associated sleeve, the provision of:
means for feeding and positioning strips of pliant material perpendicularly to and transversely across the path of travel of said mandrels to cause a positioned strip to be picked up by and to be carried along on each of said mandrels of said assemblies and to be preformed into a generally U-shape about the associated mandrel due to the relative rotational movement between each mandrel and the strip of pliant material it picks up and carries along therewith; and
curling means for curling the free ends of each preformed generally U-shaped strip about the associated mandrel into overlapping curled contact with each other prior to said strip being formed into a toroid between said associated mandrel and sleeve.

11. In an apparatus for converting strips of pliant material, such as dough, positioned on a mandrel into seamless toroids by drawing said mandrel through a forming sleeve surrounding the mandrel, the provision of:
means for partially retracting said mandrel into the associated sleeve to pinch a mid-portion of said strip between said mandrel and sleeve;
means for curling the ends of said strip about said mandrel while said mid-portion is held between said mandrel and sleeve; and
means for drawing said mandrel into and partially through said sleeve after said strip ends have been curled about said mandrel to form said strip into a toroid.

12. In an apparatus for converting strips of pliant material, such as dough, into toroids by forming the strips between relatively axially movable sleeve and mandrel assemblies including mounting means for mounting said assemblies for concurrent rotation about a common axis and means for producing relative axial movement between each mandrel and its associated sleeve, the provision of:
- means for feeding and positioning strips of pliant material perpendicularly to and transversely across the path of travel of said mandrels to cause a positioned strip to be picked up by and carried along on each of said mandrels of said assemblies and to be preformed into a generally U-shape about the associated mandrel due to the relative rotational movement between each mandrel and the strip of pliant material it picks up and carries along therewith; and
- curling means for curling the free ends of each preformed generally U-shaped strip about the associated mandrel into overlapping curled contact with each other prior to said strip being formed into a toroid between said associated mandrel and sleeve; and wherein:
- said mounting means mounts said assemblies for concurrent rotation about a generally horizontal axis and in a generally vertical plane;
- said means for feeding and positioning strips of pliant material is located adjacent one edge of said plane defined by the extremities of said assemblies and at the approximate level of said axis;
- said curling means operates on said strips in a curling zone at an upper portion of said plane;
- said means for producing relative axial movement between each mandrel and its associated sleeve operates said mandrel and sleeve in a forming zone along an edge of said plane generally opposite said feeding station; and
- means for releasing each said toroid from its associated forming assembly are provided in a discharge zone along a bottom edge of said plane generally opposite said curling zone.

13. In an apparatus for converting strips of pliant material, such as dough, into toroids by forming the strips between relatively axially movable sleeve and mandrel assemblies including mounting means for mounting said assemblies for concurrent rotation about a common axis and means for producing relative axial movement between each mandrel and its associated sleeve, the provision of:
- means for feeding and positioning strips of pliant material perpendicularly to and transversely across the path of travel of said mandrels to cause a positioned strip to be picked up by and carried along on each of said mandrels of said assemblies and to be preformed into a generally U-shape about the associated mandrel due to the relative rotational movement between each mandrel and the strip of pliant material it picks up and carries along therewith;
- curling means for curling the free ends of each preformed generally U-shaped strip about the associated mandrel into overlapping curled contact with each other prior to said strip being formed into a toroid between said associated mandrel and sleeve; and
- means for partially retracting each said mandrel relative to its associated sleeve to pinch the bight portion of said generally U-shaped strip between said mandrel and sleeve while said strip free ends are curled about said mandrel.

14. In an apparatus for converting strips of pliant material, such as dough, into toroids by forming the strips between relatively axially movable sleeve and mandrel assemblies including mounting means for mounting said assemblies for concurrent rotation about a common axis and means for producing relative axial movement between each mandrel and its associated sleeve, the provision of:
- means for feeding and positioning strips of pliant material perpendicularly to and transversely across the path of travel of said mandrels to cause a positioned strip to be picked up by and carried along on each of said mandrels of said assemblies and to be preformed into a generally U-shape about the associated mandrel due to the relative rotational movement between each mandrel and the strip of pliant material it picks up and carries along therewith;
- curling means for curling the free ends of each preformed generally U-shaped strip about the associated mandrel into overlapping curled contact with each other prior to said strip being formed into a toroid between said associated mandrel and sleeve, said curling means including an individual curling assembly on each of said sleeve and mandrel assemblies to rotate therewith;
- stationary cam means adjacent the plane of travel of said individual curling assemblies; and
- means associated with each said curling assembly for engaging said cam means on rotation past said cam means to successively curl each free end of said U-shaped strip about the associated mandrel with one end overlying the other.

15. In an apparatus for converting strips of pliant material, such as dough, into toroids by forming the strips between relatively axially movable sleeve and mandrel assemblies including mounting means for mounting said assemblies for concurrent rotation about a common axis and means for producing relative axial movement between each mandrel and its associated sleeve, the provision of:
- means for feeding and positioning strips of pliant material perpendicularly to and transversely across the path of travel of said mandrels to cause a positioned strip to be picked up by and carried along on each of said mandrels of said assemblies and to be preformed into a generally U-shape about the associated mandrel due to the relative rotational movement between each mandrel and the strip of pliant material it picks up and carries along therewith;
- curling means for curling the free ends of each preformed generally U-shaped strip about the associated mandrel into overlapping curled contact with each other prior to said strip being formed into a toroid between said associated mandrel and sleeve;

wherein:
- said means for producing relative axial movement between said mandrel and associated sleeve includes means for partially retracting said mandrel relative to said sleeve to pinch the bight portion of said strip between said mandrel and sleeve during the first curling of a first free end of said strip and for further retracting said mandrel after said first curling to draw said first free end and bight portion of said strip into said sleeve prior to the curling of the second free end of said strip about said mandrel, said second free end thereby being curled into an overlapping position above said first free end prior to being drawn into said sleeve and formed with said first end into said homogeneous toroid.

References Cited
UNITED STATES PATENTS

| | | |
|---|---|---|
| 1,726,113 | 8/1929 | Miller. |
| 2,584,514 | 2/1952 | Thompson et al. _____ 107—8 |
| 3,315,618 | 4/1967 | Groff. |

WALTER A. SCHEEL, *Primary Examiner.*

J. SHEA, *Assistant Examiner.*